United States Patent [19]

Dallaire

[11] 4,372,470
[45] Feb. 8, 1983

[54] CAR RACK

[75] Inventor: Michel J. Dallaire, Montreal, Canada

[73] Assignee: Bic Corporation, Milford, Conn.

[21] Appl. No.: 210,341

[22] Filed: Nov. 25, 1980

[51] Int. Cl.³ .............................................. B60R 9/12
[52] U.S. Cl. .................................. 224/324; 224/323; 224/315; 224/917; 211/60 SK
[58] Field of Search .............. 224/331, 309, 315, 319, 224/321, 322, 323, 325, 329, 324, 917; 211/60 SK; 248/316 R, 316 B, 316 D; 24/60 SK

[56] References Cited

U.S. PATENT DOCUMENTS 3,348,747 10/1967 Vuarchex ........................... 224/315
3,836,058 9/1974 Penniman et al. .................. 224/315
3,893,606 7/1975 Hofmann ....................... 224/319 X
3,897,895 8/1975 Read ............................ 224/917 X Primary Examiner—Steven M. Pollard
Attorney, Agent, or Firm—Pennie & Edmonds

[57] ABSTRACT

A car rack adapted to be secured on the top of a car for carrying articles. The car rack comprises: a support base having end shoes resting on the top of the car near lateral edges thereof, resiliant means provided inside the support base and adapted to removably but solidly secure the support base on the top of the car, and carrying elements removably connected to the support base for carrying articles.

32 Claims, 8 Drawing Figures

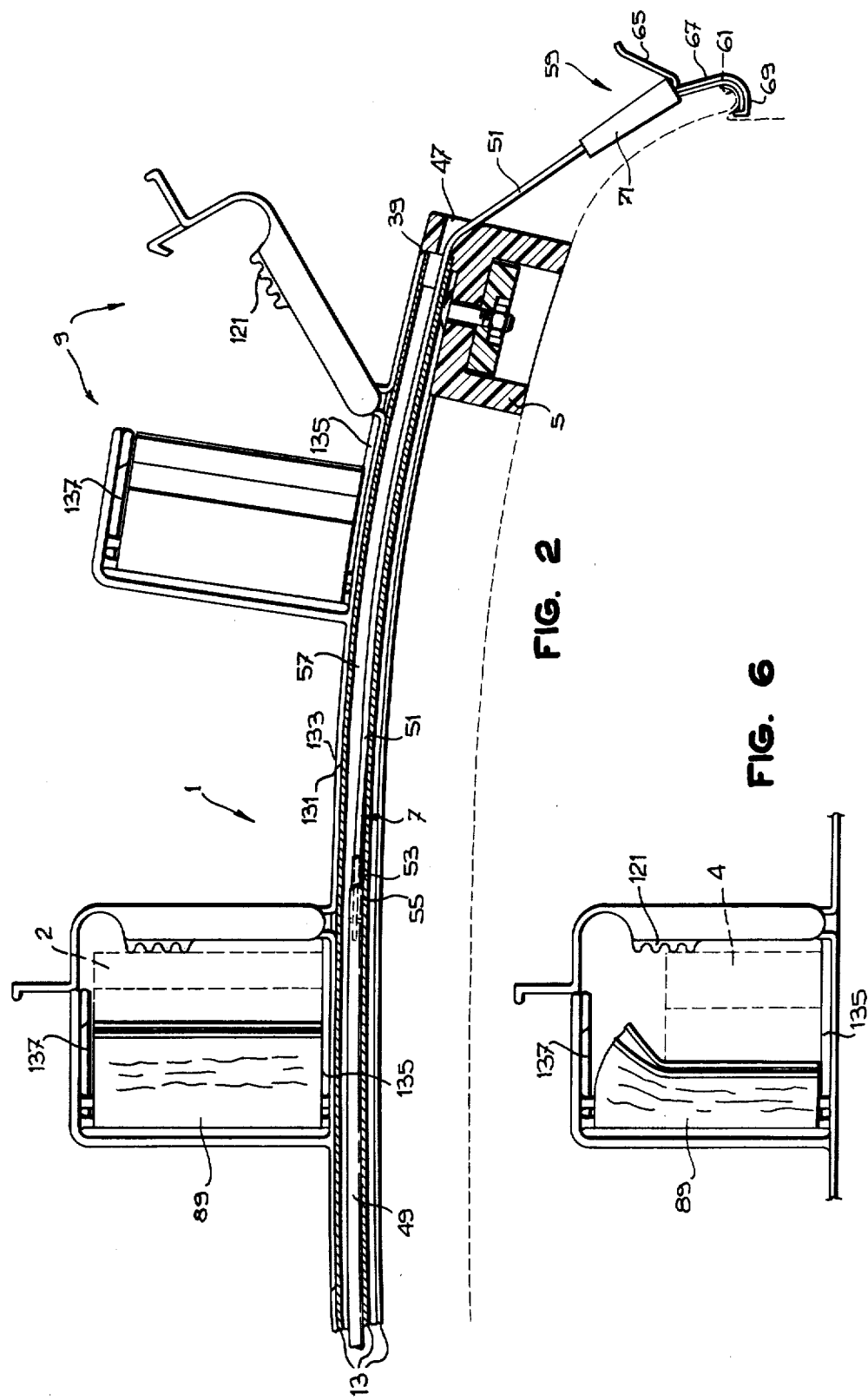

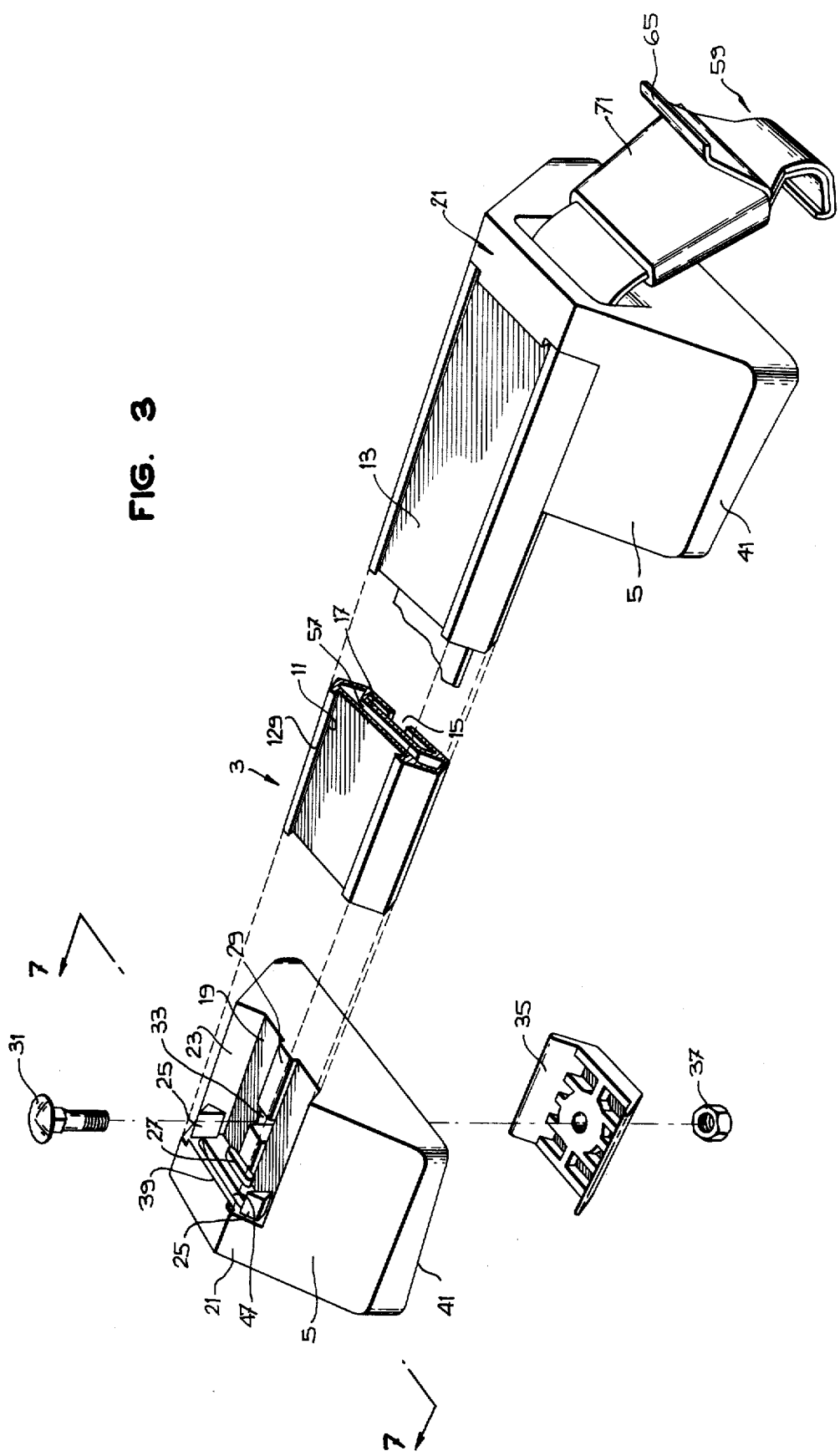

CAR RACK

The present relates to a car rack adapted to be secured on the top of a car for carrying articles such as skis or other loads.

Several types of car racks are already known, but each has its disadvantages which the present invention intends to overcome.

As example, the U.S. Pat. No. 3,836,058 teaches a rach construction for carrying skis or the like on the top of a vehicle, comprising upstanding post members and a single lockable actuator at one end of the rack to set or release all post pairs in unison. Therefore, each pair of post comprises a fixed post and a movable post, the movable posts being all ganged in their connection to the single actuator. Therefore, it is evident that such a construction is complicated, expensive and when out of order difficult to fix.

The U.S. Pat. No. 4,015,760 describes a luggage rack consisting of a slats made from roll formed strips of sheet metal. Each slat has a pair of upwardly converging inner walls defining a groove therebetween which runs the length of the slat. The groove receives and holds a fastener or the like for securing an adjustable tie-down member or other article securing device on the slat. The slat also has outer walls spaced on the opposite sides of the inner walls with supporting ledges connecting the upper ends of the inner and the outer walls on opposite sides of the groove. The article to be transported can rest directly on the supporting ledges or on a decorative and protective plastic strip which is mounted on the ledges and is held in place by resilient ribs formed of its underside and fitted in the slat groove. Rope means are provided to tie-down the various articles placed on the slats.

Such a rack construction is remote from the rack construction of the present invention.

In the Swiss Pat. No. 433,021 it is shown a ski support element having a pivoting arm which swings open to receive the skis and snaps shut to clamp them in place. However, such a support element is not as effective as a support element should be and its operation is rather complicated.

The present invention overcomes the above drawbacks and provides a car rack which is easy to manufacture, non-expensive, simple, lightweight, non lockable, espacially designed for fast and easy mounting and removal.

Furthermore, the car rack of the present invention is made of a material which is resistant to cold weather, is very easily installed on the top or roof of the car without any tools which during the winter time is a big advantage, and is made of different parts which are easily disassembled and reassembled, if desired. This is particularly true for the load carrying elements which are removable from their position in the rack and which can be substituted by different kinds of carrying elements for carrying differend kinds of loads. For instance, if the loads to be carried on the top of a car are skis, carrying elements shaped especially for that purpose are used. If the laod to be carried is a different article, different type of carrying elements adapted for the specific purpose may be used.

A further advantage of the car rack of the present invention is that it is made of such material that it does not scratch or mar the car finishes, and fits most types of cars with or without drip rails.

Furthermore, when not in use, the car rack fits nicely in the luggage compartment of the car.

Another advantage of the present invention is to provide a car rack wherein the elongated support base is provided with a resilient means extending longitudinally thereacross and captive therein whereby to removably and solidly secure the base on the top of the car.

According to the above advantages, from a broad aspect, the present invention provides a car rack adapted to be secured, at least in pairs, on the top of a car for carrying articles. The rack comprises an elongated support base having support means resting on the top of the car for supporting the base space from the top. Resilient means extends longitudinally across the support base and captive in a channel thereof and adapted, at their opposed ends, to removably but solidly secure the support base on the top of the car. One or more carrying elements are removably connected to the support base for carrying articles.

A preferred embodiment of the invention will now be described as an example only, having reference the attached drawings wherein:

FIG. 2 is an enlarged partial side view of a car rack according to the present invention;

FIG. 3 is an exploded perspective view of a car rack according to the present invention;

FIG. 5 is located on the sheet containing FIG. 1;

FIG. 6 is a side view of a carrying element according to the present invention carrying a pair of alpine skis. FIG. 6 is located on the sheet containing FIG. 2;

Figure 1:
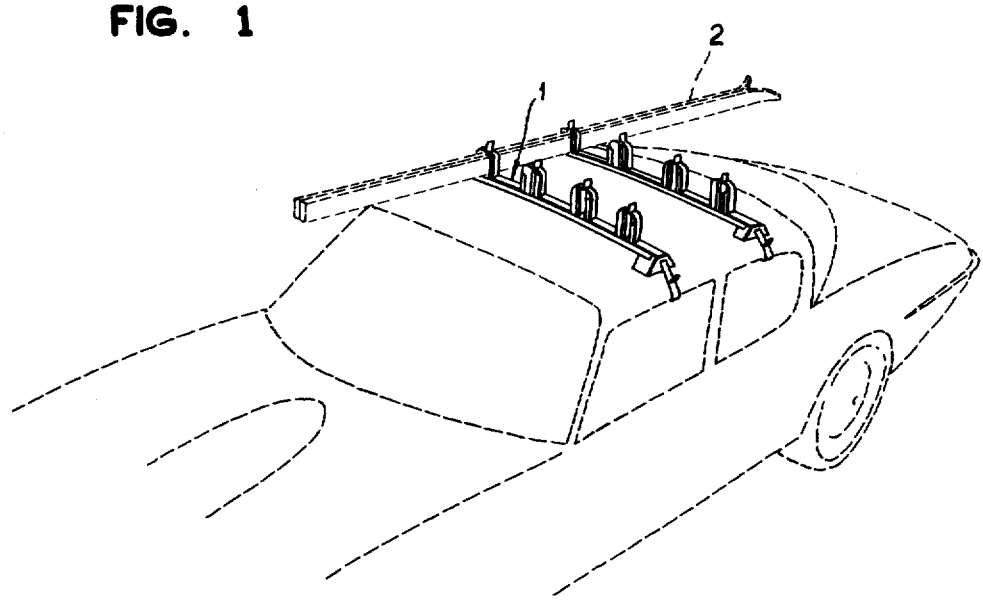
FIG. 1 is a perspective view of a pair of car racks according to the present invention installed on the top of a car.

Referring to the Figures, FIG. 1 shows a pair of car racks 1 made according to the present invention and secured on the top of a car at a convenient distance from each other for carrying articles which in FIG. 1 are shown as skis 2.

As best shown in FIG. 2 each car rack 1 comprises a support base 3 having end shoes 5, the end shoes resting on the top of the car, near the lateral edges thereof (see FIG. 1).

Resilient means 7 are provided inside the support base 3, and are adapted to removably but solidly secure the support base 3 on top of the car.

Figure 4:
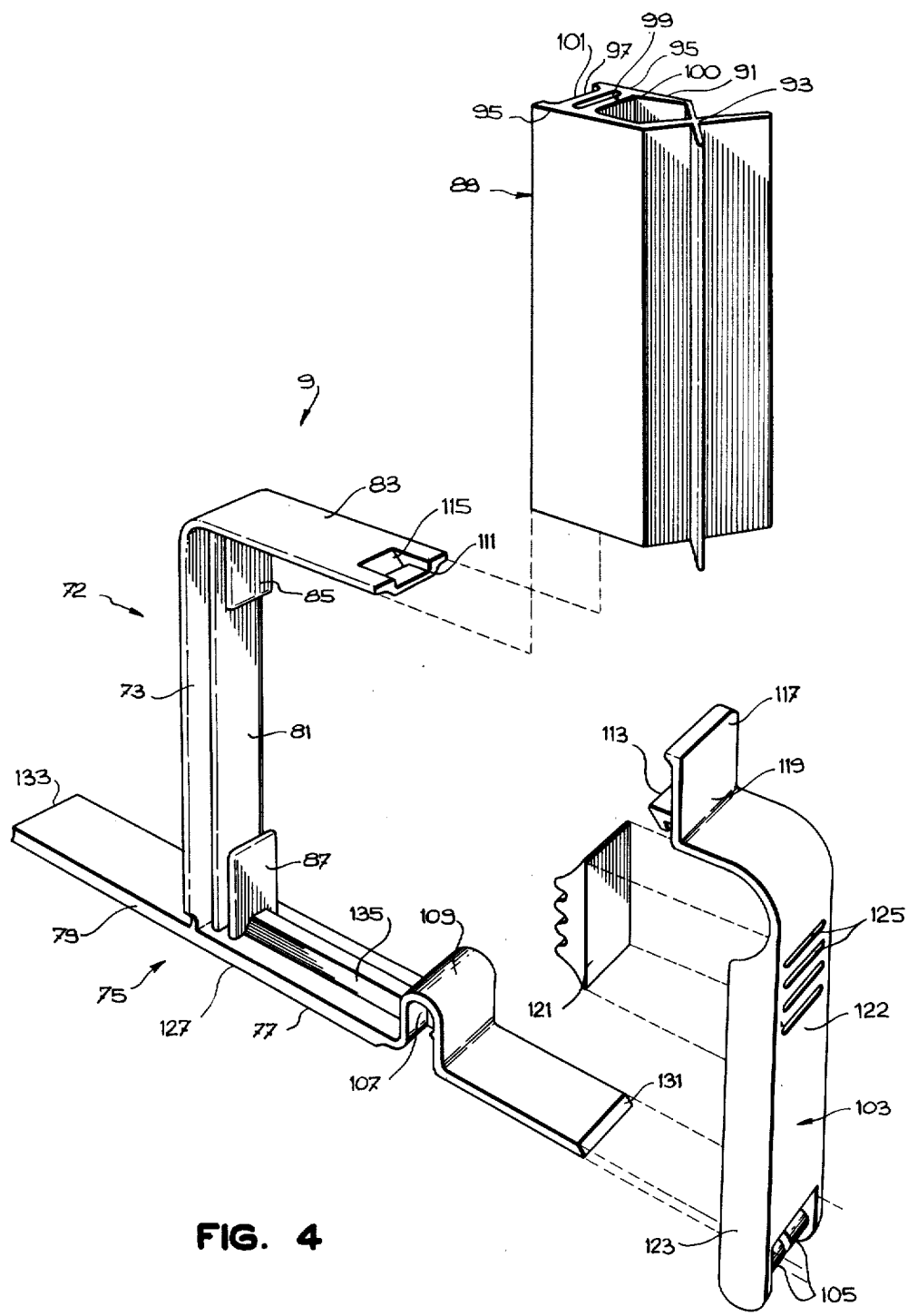
FIG. 4 is an exploded perspective view of a load carrying element used in the rack according to the present invention.
Figure 7:
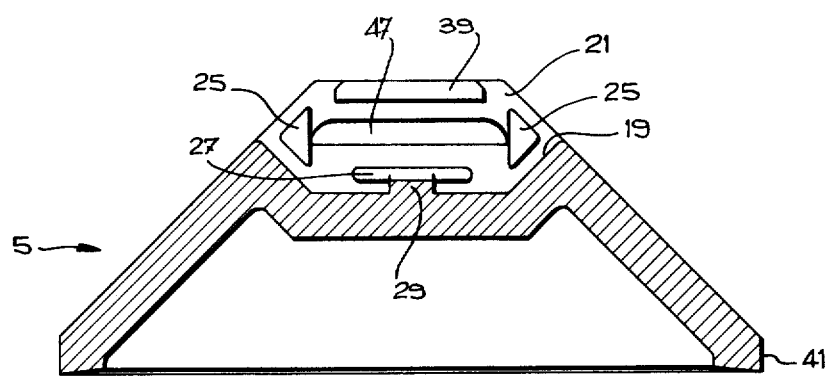
FIG. 7 shows a cross-section according to line 7—7 of FIG. 3.

Carrying elements 9 are slidably and removably inserted inside rail means 11 (see FIG. 4) provided in the support base 3 for carrying articles.

As best shown in FIG. 3, the support base 3 comprises a support bar 13, slightly curved to conform to the shape of the roof of the car, the top of which is provided with the rail means 11. The support bar 13 has, in cross-section, the form of a flattened hexagon which is hollow and the bottom side of which is provided with a slot 15 running along the entire length of the support bar 13. The slot 15 opens into a trapezoid shaped inner section 17 which also runs along the entire length of the support bar 13. The flattened hexagon form of the support bar 13 provides a better resistance to the wind.

The support bar 13 is made of extruded aluminum or aluminum alloy, and is covered with an epoxy powder or the like or it is anodized.

The end shoes 5 are provided at the end of the support bar 13. The end shoes 5 and the support bar 13 form the support base 3.

Each end shoe (or end cushions) 5 is in the form of a truncated pyramid as best shown in FIG. 3 and is provided with a groove 19 in the shape of an U with open inclined sides 23, the groove 19 being adapted to receive the lower part of the hexagon shaped support bar 13. The outer extremity of each shoe forms an end wall 21 which overlooks the groove 19 and therefore hides the groove 19 from view when one looks from each side of the support base 3.

On each inclined side 23 of the groove 19 and next to the end wall 21 overlooking the groove 19, there are provided two triangular stop or securing elements 25 adapted to be inserted inside the hollow hexagon shaped support bar 13 in order to secure the support bar 13 inside the groove 19. For the same purpose is provided a further securing finger element 27 extending toward the groove 19 from the end wall 21, the further element 27 being adapted to be inserted inside the trapezoid shaped inner section 17 of the support bar 13. Furthermore, a protruding central lane part 29 is provided at the center of the groove 19 and is adapted to be inserted inside the slot 15 of the support bar 13. Therefore, it is evident that the stop elements 25, the securing element 27 and the protruding central part 29 all contribute to the securing of the support bar 13 inside the groove 19 of each end shoe 5. Beside these securing elements, there is provided a bolt 31 which traverses a hole 33 in the protruding central part 29 and through a U shaped washer element (or support plate) 35 is screwed to a nut 37. Therefore, when the bolt 33 and the nut 37 are screwed together both ends of the support bar 13 are fixedly but removably secured to the end shoes 5.

The end shoes 5 are made of T.P.R.* (which is a trade mark of UNIROYAL and stands for Thermo-plastic rubber) material which is a semi-rigid non staining, non marking, high-quality and stability material that keeps its soft property under very cold temperatures. This material can receive a foaming agent to increase or decrease the hardners of the material.

At the upper inside edge of the end wall 21 there is provided an inwardly projecting flange 39 adapted to cooperate with the inclinded edge of the support bar 13 which supports the carrying elements 9 (see FIGS. 2) which will be described more in details in the following paragraphs.

The entire perimeter of the base 41 of each end shoe 5 touches the roof of the car. This ensures a good friction and enhances the anti-ski property of the shoes 5.

Inside the upper part of the end wall 21, there is provided a transverse elongated opening 47 through which the resilient means 7 for fixing the support base 3 on the top of the car passes, as will be explained in the following paragraphs.

The resilient means 7 provided inside the support base 3 comprises a central rubber compound band 49 and two lateral nylon strips or webbings 51 (see FIG. 2). Each nylon strip 51 protrudes out of the transverse elongated opening 47 (see FIG. 3) provided in the end wall 21 as above explained. The connection between the central rubber band 49 and the lateral nylon strips 51 is made through a rubber element 53, connecting the inner end of each nylon strip 51 and each end 55 of the central rubber band 49. Such a connection is made by molding.

The rubber compound has a tension which can vary from 35 to 70 pounds according to the size of the car rack.

The reslient means 7 which as above explained comprises the central rubber band 49 and the lateral nylon strips 51 freely moves inside the upper hollow part 57 of the hexagon shaped support bar (see FIG. 3) and is provided at its both ends with hook-like elements 59 depending out from the support base 3. The hook-like elements are adapted to engage with edges 61 (see FIG. 2) of the top of the car, such edges 61 being usually upwardly curved.

Each hook-like element 59 comprises a body (not seen), connected by any known ways to the corresponding nylon strips 51 (see FIG. 2) and two arms one, upper arm 65 upwardly bent and one lower arm 67 having a hooked end 69 adapted to engage and grasp the edge 61 of the top of the car (see FIG. 2).

The hook-like elements 59 are made of cold rolled, prime quality steel or any other suitable material. It can be zinc-plated steel with baked polyester paint. The shape of the hook like-element is designed to fit the majority of car roof details. However, a protective sleeve 71 made of thermo-plastic rubber (T.P.R.* trade mark) or any other suitable plastic material is fitted on the body of the hook-like element 59, in order to prevent any scratching or maring of the top of the car in case the hook-like elements 59 touch such top.

The upper arm 65 is for easily manipulating the engaging and disengaging of the hooked end 69 of each lower arm 67 into and out of the edge 61 of the top of the car.

It is thus evident that the installation of the car rack on the top of the car does not necessitate any tools and is easily made only by hand.

Different lengths of resilient means are provided for the different type of cars.

As above-mentioned, in the rail means 11 provided on the top of the support base 3, there are provided carrying elements 9 for carrying articles which in FIG. 1 is shown as being skis. Such skis may be "country skis" or "alpine skis".

There is a plurality of carrying elements (or clips) 9 slidably and removably inserted inside the rail means 11. Each carrying element 9 is made of modified nylon such as "ZYTEL S.T."* (super tough) which is a trade mark of DUPONT or the like and comprises (see FIG. 4) a reversed T shaped element 72 having an upstanding web 73 and a transverse leg 75, one side 77 of the leg 75 being longer than the other side 79 thereof. The web 73 is integrally provided with an upstanding inner element 81 (lining) which is narrower than the width of the upstanding web 73.

A tail portion 83 is integrally connected to the free end of the web 73 and is perpendicularly bent with respect of the web 73 and extends toward the same side as the long side 77 of the leg 75. The tail portion 83 has a length shorter than the length of the long side 77 of the leg 75.

Slightly ahead of the inner upstanding element 81 and toward the long side 77 of the leg 75 there are provided two small elements, an upper small element 85 forming an integral part of the tail portion 83 and depending downwardly therefrom and a lower small element 87 forming an integral part of the long side 77 of the leg 75 and upstanding or extending upwardly therefrom. These small opposite elements are provided for removably receiving a bumper element 89 made of dense mechanical rubber, or the like and which will be explained in the following paragraphs.

The bumper element 89 (see FIG. 4) comprises a main body 91 which is substantially rectangular in form and has two cross-linked forward arms 93 and two lateral rear flanges 95 which together with a rear base portion 97 form a recess 99 with the back portion 100 of the main body 91 of the bumper element 89. The recess 99 runs along the entire length of the main body 91 of the bumper element 89. The rear lateral flanges 95 extend beyond the rear base portion 97 and form a channel 101.

For inserting the bumper element 89 in its place, which is between the upper tail portion 83 of the web 73 and the lower long side 77 of the leg 75, it is only necessary to flex the rubber body of the bumper element 89 so that the upper small element 85 and the lower small element 87 be inserted inside the recess 99 while the rear flanges 95 of the channel 101 surround the inner upstanding element 81 in such a way that the channel imprisons the inner upstanding element 81. Thus, the bumper element 89 is fixedly but removably inserted in its place.

Opposite the inner upstanding element 81 there is provided a bail element 103 made of "ZYTEL S.T."* trade mark which is removably secured at its lower part to the long side 77 of the leg 75 and is provided at its upper part with locking means to engage with locking means provided on the tail portion 83 of the web 73 as will be explained in the following paragraphs.

The bail element 103 is provided at its lower end with two opposite hinge elements 105 adapted to be inserted inside corresponding holes 107 provided on each side of a bump 109 located on the long side 77 of the leg 75 at a suitable location slightly ahead of the end 111 of the tail portion 83 of the web 73. Such a location of the bump 109 and therefore of the bail element 103 is calculated such that a pair of skis be securely inserted between the free space provided between the bumper element 89 and the bail 103 as will be explained below.

The bail element 103 has the shape of a reversed L. The upper bent part of the bail element 103 is turned toward the reversed T-shaped element 72 and is provided at its free end 119 with locking means in a form of a lug 113 adapted to be snapped into a slot 115 provided at the end part of the tail portion 83 or the web 73. A tab 117 upstands from the free end 119 of the bent part of the L shaped bail element, the tab 117 having as function the snapping of the lug 113 into and disengaging it out of the slot 115.

As the material from which is made the bail element is of modified nylon ("ZYTEL S.T."* trade mark) or the like as above indicated such a locking gives a firm support to the skis or other articles inserted between the bumper element 89 and the bail element 103 while it provides an easy manual unlocking of the bail element 103 when it is desired to remove the ski or the article from the grip of the carrying elements 9.

A further bumper element 121 in the form of a grooved rectangular member smaller than the bumper element 89 is connected to the inside surface of the bail element 103, the upstanding part 122 of the reversed L shaped bail element 103 having side flanges 123 surrounding the lateral sides of the further bumper element 121. Such a further bumper element 121 the grooves 122 of which are turned toward the cross-linked arms 93 of the bumper element 89 provides a resilient support along which the resilient support provided by the bumper element 89 for the skis or articles carried by the carrying elements 9.

On the back surface of the upstanding part 122 of the bail element 103 there are provided grooves 125 intended to facilitate the placing of the thumb thereon during the locking or the unlocking of the bail element 103.

The transverse leg 75 of each carrying element 9 has downwardly and outwardly inclined lateral longitudinal edges 127 adapted to match with corresponding upwardly and inwardly inclined edges 129 of the rail means 11 inside which the carrying elements are inserted. Furthermore, the transverse edges 131 and 133 of the long side 77 and of the short side 79, respectively, of each reversed T-shaped element 72 are also beveled but in opposite directions i.e. one 133, downwardly and outwardly and the other 131, upwardly and inwardly, so that when the carrying elements 9 are consecutively inserted inside the rail means 11, two adjacent edges 131 and 133 of two adjacent carrying elements 9 having opposite inclination, overlap and form a flush upper surface (see FIG. 2).

Figure 5:
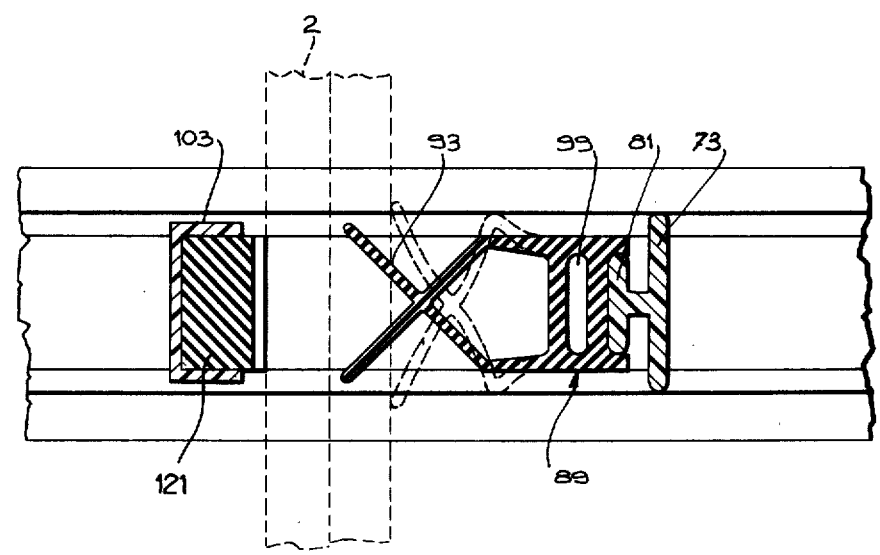
FIG. 5 is a top view of one carrying element in its skis holding position.

As shown in FIG. 5, when skis or other articles are inserted into the space between the bumper element 89 and the further bumper element 121 of bail element 103, the cross-linked arms 93 flex (see broken lines in FIG. 5) and securely hold the skis and/or articles inside the carrying elements.

FIG. 5 shows cross-country skis 2 held by the carrying elements 9. FIG. 6 shows alpine skis 4, which are narrower in width, held between the bumper element 121 of the bail element 103 and the bumper element 89. Therefore, the bumper element 89 shows an upper part which is partly overhanging the skis 4.

Of course, the form and the shape of the carrying elements 9 may be modified and therefore, instead of skis, other articles may be carried on the rack placed and secured on the top of the car. In fact, instead of ski clips 9, carry-all attachments may be inserted in the support bar 13.

The inner surface of the long side 77 of the transverse leg 75 of each reversed T-shaped element 72 is provided between the lower small element 87 and the bump 109 with a central trapezoid shaped longitudinal protuberance 135. A similar central longitudinal trapezoid protuberance 137 is provided on the inner surface of the tail portion 83. These protuberances prevent the skis from touching the inner surface of the transverse leg 75 and the inner surface of the tail portion 83.

Figure 8:
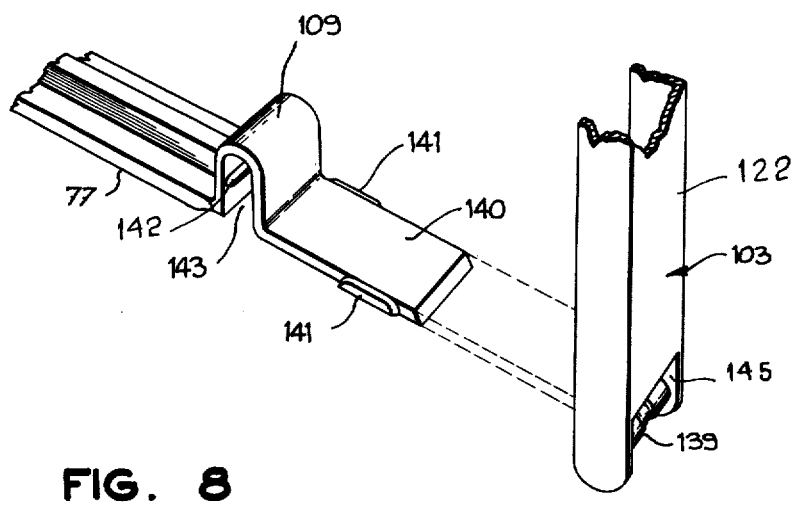
FIG. 8 shows an embodiment of the carrying element.

In the embodiment shown in FIG. 8, the hinge elements 105 are connected together to form a single pivot shaft 139, the end portion 140 of the long side 77 of the leg 77 is provided with two lateral protuberances 141 staggered one with respect to the other, and the bump 109 is provided with a single opening 143 running through the width of the bump 109. The pivot shaft 139 of the bail element 103 is inserted into the opening 143 of the bump 109 by forcibly passing the gap 145 provided between the pivot shaft 139 and the upstanding part 122 of the bail element 103 through the said protuberances 141 when all these elements are still hot, to finally lodge the pivot shaft 139 inside the opening 143. The pivot shaft 139 is maintained inside opening 143 by means of a bar 142 and can pivot therein. However, the bail element 103 cannot be removed out of its location as it is the case in the embodiment shown in FIG. 4 because of the protuberances 141. Furthermore, the lateral protuberances 141 assist in securely maintaining the end portion 140 of the long side 77 of leg 75 inside the inclined edges 129 of the rail means.

It is to be understood that the above description was made with a certain degree of particularity, but the present disclosure has been made only by way of example and that numerous changes in the details of construction and the combination and arrangement of parts as well as in the material used may be resorted to without departing from the scope of the invention.

I claim:

1. A car rack adapted to be secured, at least in pairs, on the top of a car for carrying articles, comprising:
   an elongated support base having support means resting on the top of the car for supporting said base spaced from said top,
   resilient means extending longitudinally across said support base and captive in a channel thereof and adapted at their opposed ends to removably but solidly secure said support base on the top of the car, and
   one or more carrying elements removably connected to said support base for carrying articles, each carrying elements being a reversed T-shaped element having a web and a transverse leg, one side of the leg being longer than the other side thereof, a tail portion integrally connected to the free end of said web and being perpendicularly bent with respect thereto, a bail element opposite said web and connected to the long side of said leg, said bail element having locking means at its free end to engage with corresponding locking means provided at the free end of said bail portion, and a bumper element being connected to said reversed T-shaped element opposite said bail element.

2. A car rack as claimed in claim 1 wherein
   said support means are end shoes resting on the top of the car near lateral edges thereof,
   said resilient means having end hook-like elements depending out from said support base for engaging with edges of the top of the car,
   said carrying elements being slidably and removably inserted inside rail means provided in said support base.

3. A car rack according to claim 2, wherein said support bar is slightly curved longitudinally in order to conform to the shape of the roof of the car.

4. A car rack according to claim 3, wherein said end shoes are made of thermo-plastic rubber material.

5. A car rack according to claim 3, wherein said support bar is made of extruded metal.

6. A car rack according to claim 2, wherein said support bar, has in cross-section the shape of a flattened hexagon which is hollow and has a bottom side provided with a slot running along the entire length of the support bar, the slot opening into a trapezoid shaped inner section which also runs along the entire length of the support bar.

7. A car rack according to claim 2, wherein said support bar is made of aluminum alloy and is covered with an epoxy powder.

8. A car rack according to claim 2, wherein said support bar is made of aluminum alloy and is anodized.

9. A car rack according to claim 2, wherein each end shoe is in the form of a truncated pyramid and is provided with a groove in the shape of a "U" with open inclined sides, said groove being adapted to receive the lower part of said hexagon shaped support bar.

10. A car rack according to claim 9, wherein said each end shoe has an outer extremity which form an end wall overlooking said groove.

11. A car rack according to claim 10, wherein on each inclined side of said groove and next to the end wall of each end shoe there are provided two triangular stop elements adapted to be inserted inside the hollow hexagon shaped support bar, furthermore there is also provided a finger element extending toward said groove from said end wall, said finger element being adapted to be inserted inside said trapezoid shaped inner section of said support bar, a protruding central part being also provided at the center of said groove adapted to be inserted inside said slot at the bottom side of said support bar, said triangular stop elements, said finger element and said central protruding part all contributing to the securing of the support bar in said groove of each end shoe.

12. A car rack according to claim 11, further comprising a bolt, a U shaped support plate and a nut associated with each end shoe, said bolt traversing a hole in the protruding central part of said groove and through said support plate being screwed to said nut.

13. A car rack according to claim 2, wherein each end shoe has a base, the perimeter of which touches the roof of the car.

14. A car rack according to claim 13, wherein said resilient means comprises a central rubber compound band and two lateral nylon strips, each strip protruding out of a transverse elongated opening provided in said end wall, said resilient means freely moving inside the upper hollow part of said hexagon shaped support bar, and being provided at its both ends with hook-like elements depending out from said support base.

15. A car rack according to claim 14, wherein each hook element comprises a body connected to the corresponding nylon strip and two arms, one upper arm upwardly bent and a lower arm having a hooked end adapted to engage and grasp the edge of the roof of the car.

16. A car rack according to claim 15, wherein said hook element is made of cold rolled steel.

17. A car rack according to claim 15, wherein a protective sleeve is inserted on the body of the hook-like element.

18. A car rack according to claim 17, wherein said protective sleeve is made of thermo-plastic rubber.

19. A car rack according to claim 2, wherein said resilient means have different lengths for different type of cars.

20. A car rack according to claim 1, wherein said bail element is removably connected to said long side of said leg.

21. A car rack according to claim 20, wherein said bumper element is removably connected to said reversed T shaped element.

22. A car rack according to claim 1, wherein said bumper element is made of dense mechanical rubber.

23. A car rack according to claim 1, wherein said bumper element comprises a main body having two cross-linked forward arms and two lateral rear flanges, said rear flanges together with a rear base portion form a recess with a back portion of said main body, said recess running along the entire length of said main body, and being adapted to removably receive said small elements in order to removably secure said bumper element against said web of said reversed T-shaped element, said lateral rear flanges extending beyond said rear base portion and forming a channel which imprisons said inner upstanding element when the bumper element is secured in its place.

24. A car rack according to claim 23, wherein said bail element is provided at its lower end with two opposite hinge elements adapted to be inserted inside corresponding holes provided on each side of a bump located on said long side of said leg at a location slightly ahead of the free end of the tail portion of the web.

25. A car rack according to claim 24, wherein said bail element has the shape of a reversed L, the upper bent part of said L shaped bail element being turned toward said reversed T shaped element and is provided at its free end with said locking means in the form of a lug adapted to be snapped into said further locking means in the form of a slot provided at the end part of said tail portion of said web.

26. A car rack according to claim 25, wherein said bail element further comprises a tab upstanding from said free end of said bent part of said L shaped bail element, said tab for snapping said lug into and disengaging it from said slot.

27. A car rack according to claim 26, wherein said bail element is made of modified nylon.

28. A car rack according to claim 27, wherein said further bumper element is in the form of a grooved rectangular member, the grooves being formed toward said cross-linked arms of said first bumper element, the upstanding part of the reversed L shaped bail element having side flanges surrounding lateral sides of said further bumper element.

29. A car rack according to claim 28, wherein on the back surface of the upstanding part of the bail element are provided grooves intended to make easy the placing of the thumb thereon during the locking and unlocking of the bail element.

30. A car rack according to claim 29, wherein said transverse leg of each carrying element has downwardly and outwardly inclined lateral longitudinal edges adapted to be inserted inside corresponding upwardly and inwardly inclined edges of the rail means inside which the carrying elements are inserted, furthermore said long side and said short side of each transverse leg having transverse edges which are bevelled in opposite directions, i.e., one transverse edge downwardly and outwardly and the opposite transverse edge upwardly and outwardly so that when said carrying elements are consecutively inserted inside said rail means, two adjacent edges of two adjacent carrying elements having opposite inclination, overlap and form a flush upper surface.

31. A car rack according to claim 30, wherein the inner surface of said long side of said transverse leg of each reversed T shaped element is provided between said lower small element and said bump with a central trapezoid shaped longitudinal protuberance, a similar central longitudinal protuberance being also provided on the inner surface of said tail portion.

32. A car rack according to claim 1, wherein said bail element is provided at its lower end with a single pivot shaft, the end portion of the long side of the leg is provided with two lateral protuberances staggered one with respect to the other, and the bump is provided with a single opening running through the width of the bump, the pivot shaft being pivotally but nonremovably lodged inside said opening of the bump.

* * * * *